United States Patent
Uenishi

(10) Patent No.: US 10,967,470 B2
(45) Date of Patent: Apr. 6, 2021

(54) MACHINE TOOL

(71) Applicant: FANUC CORPORATION, Yamanashi (JP)

(72) Inventor: Daisuke Uenishi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/441,264

(22) Filed: Jun. 14, 2019

(65) Prior Publication Data

US 2020/0016708 A1    Jan. 16, 2020

(30) Foreign Application Priority Data

Jul. 13, 2018  (JP) .............................. JP2018-133387

(51) Int. Cl.
*B23Q 3/12*         (2006.01)
*B23Q 3/157*        (2006.01)
(Continued)

(52) U.S. Cl.
CPC .................. *B23Q 3/12* (2013.01); *B23C 5/26* (2013.01); *B23Q 3/1554* (2013.01);
(Continued)

(58) Field of Classification Search
CPC . Y10T 483/12; Y10T 483/13; Y10T 483/132; Y10T 483/134; Y10T 483/136;
(Continued)

(56) References Cited

U.S. PATENT DOCUMENTS 3,587,359 A * 6/1971 McCash ................... B23Q 5/20
                                                    408/124
4,356,621 A * 11/1982 Tomita ............... B23Q 3/15553
                                                    409/232
(Continued)

FOREIGN PATENT DOCUMENTS

JP         S58-40340 U      3/1983
JP         S60-143627 U     9/1985
           (Continued)

OTHER PUBLICATIONS

An Office Action; "Notice of Reasons for Refusal," mailed by the Japanese Patent Office dated Jun. 30, 2020, which corresponds to Japanese Patent Application No. 2018-133387 and is related to U.S. Appl. No. 16/441,264; with English language translation.

(Continued)

*Primary Examiner* — Erica E Cadugan
*Assistant Examiner* — Yasir A Diab
(74) *Attorney, Agent, or Firm* — Studebaker & Brackett PC

(57) ABSTRACT

A machine tool includes: a tool holder which includes a key groove; a spindle drive unit which includes a spindle key that can be fitted into the key groove of the tool holder and a spindle and which removably holds the tool holder; a tool exchanger which includes a grip key and a grip that holds the tool holder at a fixed position with respect to the spindle; and a numerical controller which controls the tool exchanger so as to fit and remove the tool holder with respect to the spindle, and the numerical controller controls the spindle drive unit such that when the tool holder is fitted to the spindle, in a state where the key groove of the tool holder is inserted in the spindle key, the spindle is rotated to press the spindle key to the key groove so as to determine the phase of the tool holder with respect to the spindle.

3 Claims, 14 Drawing Sheets

(51) Int. Cl.
*B23Q 16/00* (2006.01)
*B23Q 15/26* (2006.01)
*G05B 19/18* (2006.01)
*B23Q 3/155* (2006.01)
*B23C 5/26* (2006.01)
*B23Q 3/18* (2006.01)

(52) U.S. Cl.
CPC ...... *B23Q 3/15534* (2016.11); *B23Q 3/15706* (2013.01); *B23Q 3/186* (2013.01); *B23Q 15/26* (2013.01); *B23Q 16/001* (2013.01); *G05B 19/18* (2013.01); *B23Q 2003/155404* (2016.11); *Y10S 483/902* (2013.01); *Y10T 483/13* (2015.01); *Y10T 483/1795* (2015.01)

(58) Field of Classification Search
CPC ........... Y10T 483/138; Y10T 483/1733; Y10T 483/1743; Y10T 483/1745; Y10T 483/1748; Y10T 483/1864; B23Q 3/12; B23Q 3/1554; B23Q 2003/155404
See application file for complete search history.

(56) References Cited

U.S. PATENT DOCUMENTS

| | | | | |
|---|---|---|---|---|
| 4,827,599 A | * | 5/1989 | Winkler | B23Q 3/15706 483/35 |
| 5,263,918 A | * | 11/1993 | Ruetschle | B23B 31/00 408/239 R |
| 5,423,643 A | * | 6/1995 | Suzuki | B23B 31/113 279/91 |
| 5,752,904 A | * | 5/1998 | Irri | B25J 15/0491 483/13 |
| 5,795,114 A | * | 8/1998 | Schweizer | B23B 29/0345 409/230 |
| 5,860,775 A | * | 1/1999 | Kim | B23Q 16/001 408/124 |
| 6,332,861 B1 | * | 12/2001 | Otsuka | B23Q 3/15706 483/13 |
| 6,456,896 B1 | * | 9/2002 | Ito | G05B 19/404 700/174 |
| 2004/0029690 A1 | * | 2/2004 | Takaku | B23Q 17/003 483/7 |
| 2005/0238447 A1 | * | 10/2005 | Murota | B23Q 17/22 409/194 |
| 2011/0098165 A1 | * | 4/2011 | Tomioka | B23B 31/1071 483/58 |
| 2015/0290755 A1 | * | 10/2015 | Isobe | B23Q 3/15534 483/56 |
| 2016/0303697 A1 | * | 10/2016 | Isobe | B23Q 3/15722 |

FOREIGN PATENT DOCUMENTS

| | | |
|---|---|---|
| JP | S60-191738 A | 9/1985 |
| JP | H01-114244 U | 8/1989 |
| JP | H03-62745 U | 6/1991 |
| JP | H04-159100 A | 6/1992 |
| JP | H06-91484 A | 4/1994 |
| JP | 2002-307257 A | 10/2002 |
| JP | 2003-181735 A | 7/2003 |
| JP | 2005-329493 A | 12/2005 |

OTHER PUBLICATIONS

An Office Action; "Notice of Reasons for Refusal," mailed by the Japanese Patent Office dated Nov. 17, 2020, which corresponds to Japanese Patent Application No. 2018-133387 and is related to U.S. Appl. No. 16/441,264 with English language translation.

* cited by examiner

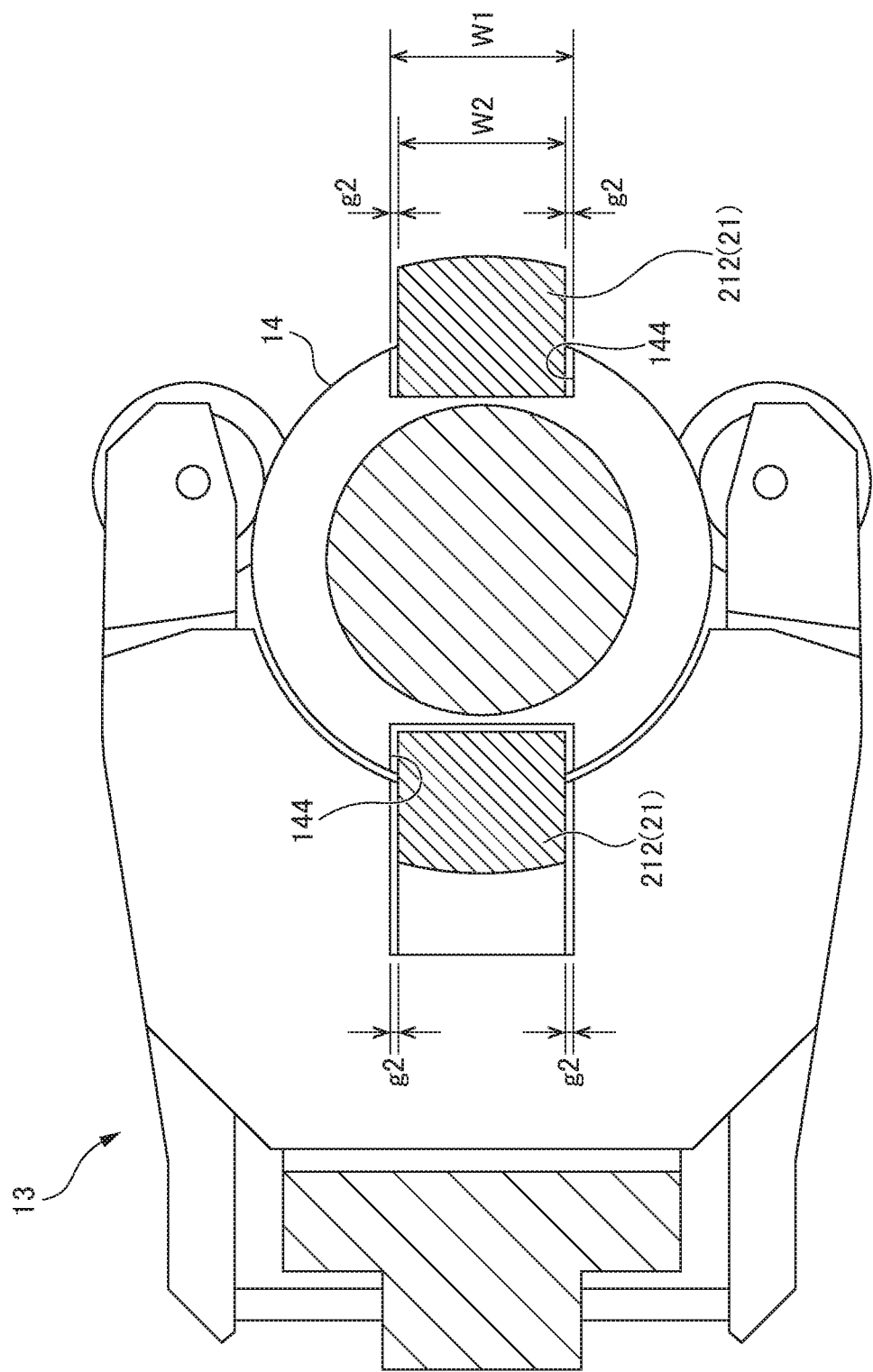

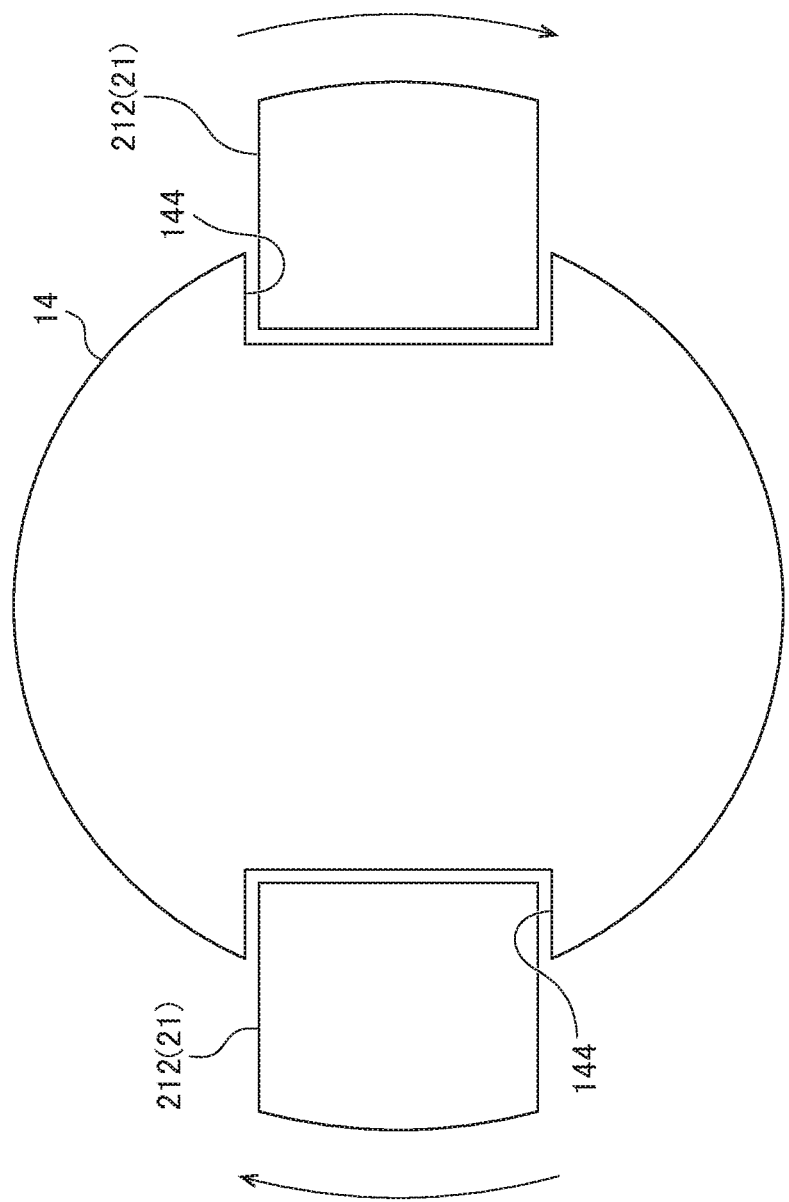

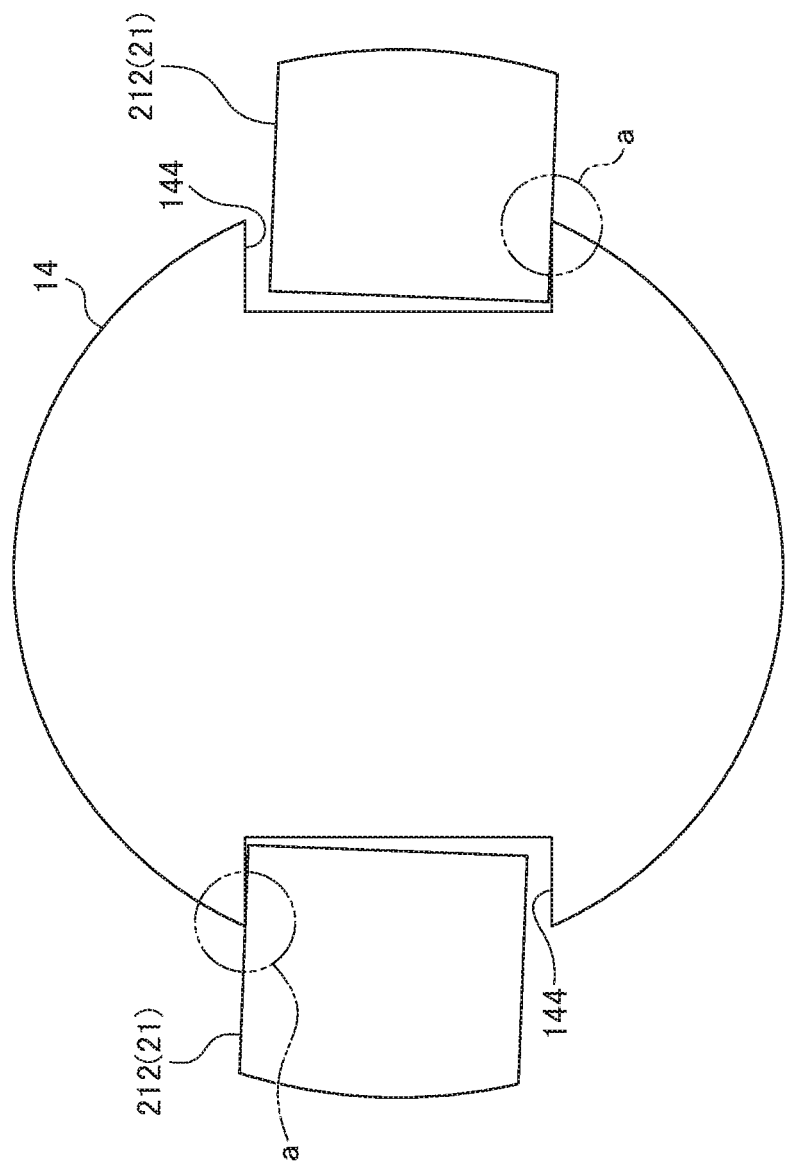

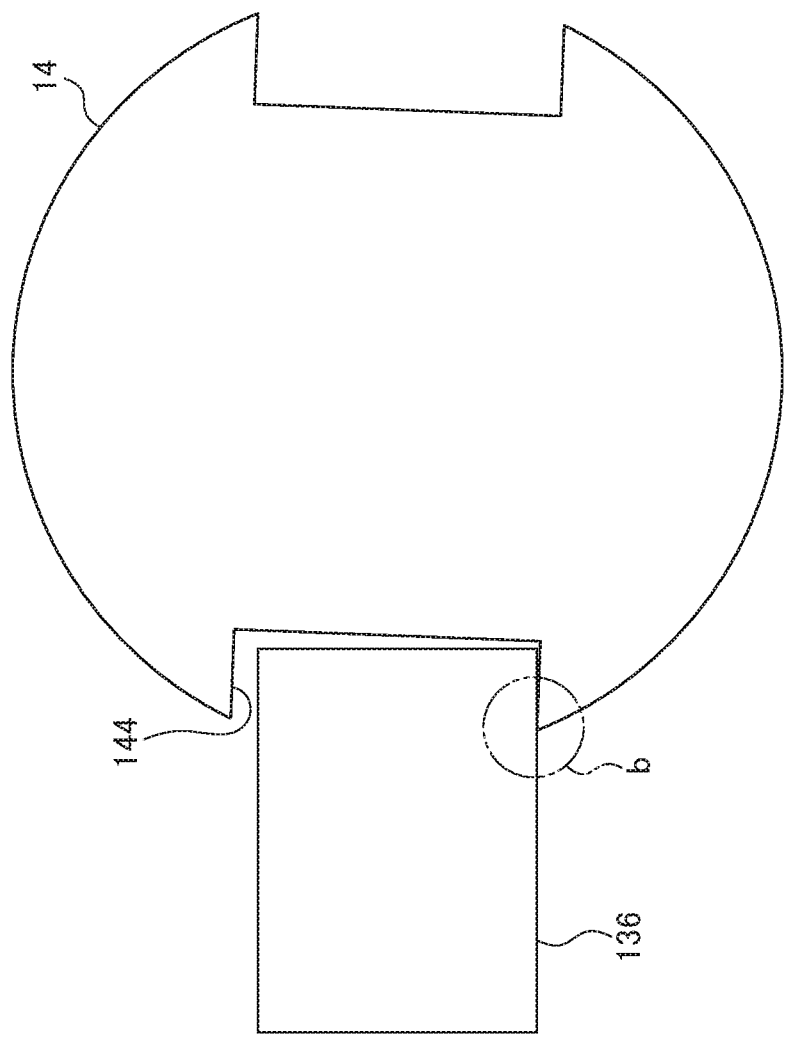

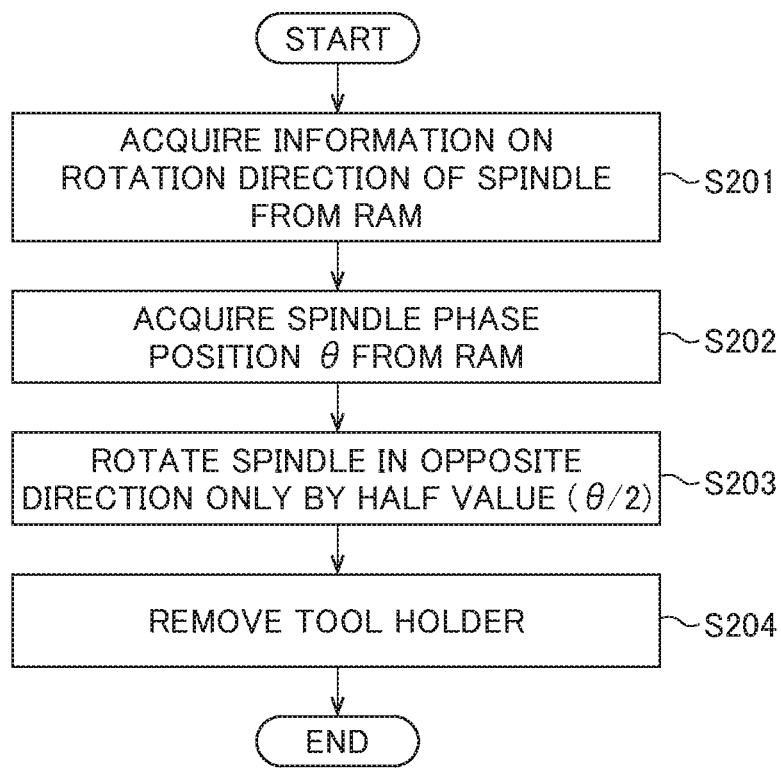

MACHINE TOOL

This application is based on and claims the benefit of priority from Japanese Patent Application No. 2018-133387, filed on 13 Jul. 2018, the content of which is incorporated herein by reference.

BACKGROUND OF THE INVENTION

Field of the Invention

The present invention relates to machine tools.

Related Art

In machining using a machine tool, machining (for example, hale machining) is known in which a spindle head is moved with a spindle fixed and in which thus cutting is performed on a workpiece with a tool fitted to a tip of the spindle. In this type of machining, the tool is moved on the workpiece with the spindle fixed, and thus it is important to determine the phase (rotation position) of a tool holder to which the tool is attached with respect to the rotation direction of the spindle. However, between a spindle key provided in the spindle and a key groove of the tool holder, a slight gap is formed in order to facilitate the fitting and removal of the tool holder. Hence, each time the tool holder (tool) is changed, the position of determination of the phase of the tool holder with respect to the rotation direction of the spindle is displaced. In order to solve this problem, a technology is proposed in which an elastic member is added to the spindle or the key groove of the tool holder or a tapered surface is added so as to determine the phase (see, for example, Patent Documents 1 to 3).

Patent Document 1: Japanese Unexamined Patent Application, Publication No. 2002-307257

Patent Document 2: Japanese Unexamined Utility Model Application, Publication No. H01-114244

Patent Document 3: Japanese Unexamined Utility Model Application, Publication No. H03-62745

SUMMARY OF THE INVENTION

When the structure of the conventional technology described above is adopted, and the specifications of the spindle and the tool holder in the machine tool are changed, they are not compatible with the machine facilities of existing machine tools, and thus the tool holder cannot be shared, with the result that the cost of incidental facilities for acquiring the compatibility is increased. Since a large load is placed on the key groove of the tool holder depending on machining (for example, hob machining), it is difficult to adopt a structure in which an elastic member is added to the key groove or a tapered surface is added and in which thus rigidity is lowered.

An object of the present invention is to provide a machine tool which can perform phase determination simply and reliably without changing existing machine facilities.

(1) The present invention relates to a machine tool (for example, a machine tool 1 which will be described later) including: a tool holder (for example, a tool holder 14 which will be described later) which includes a tool and a key groove (for example, a key groove 144 which will be described later); a spindle drive unit which includes a spindle key (for example, a spindle key 212 which will be described later) that can be fitted into the key groove of the tool holder and a spindle (for example, a spindle 21 which will be described later) and which removably holds the tool holder; a tool exchanger (for example, a tool exchanger 10 which will be described later) which includes a grip key (for example, a grip key 136 which will be described later) that can be fitted into the key groove of the tool holder and a grip (for example, a grip 13 which will be described later) that holds the tool holder at a fixed position with respect to the spindle; and a numerical controller (for example, a numerical controller 30 which will be described later) which controls the tool exchanger so as to fit and remove the tool holder with respect to the spindle, and in the machine tool, the numerical controller controls the spindle drive unit such that when the tool holder held by the grip is fitted to the spindle, in a state where at least the key groove of the tool holder is inserted in the spindle key, the spindle is rotated to press the spindle key to the key groove of the tool holder so as to determine the phase of the tool holder with respect to the spindle.

(2) Preferably, the machine tool of (1) includes a load threshold value storage unit (for example, a RAM 303 which will be described later) which stores a threshold value for a load applied to the spindle, and when the phase of the tool holder is determined, the numerical controller determines, based on the load (for example, a load torque value T1 which will be described later) applied to the spindle and the threshold value (for example, a load torque threshold value Tth which will be described later) for the load stored in the load threshold value storage unit, whether or not the determination of the phase of the tool holder is completed.

(3) Preferably, the machine tool of (1) or (2) includes a rotation direction storage unit (for example, a RAM 303 which will be described later) which stores information on the rotation direction of the spindle when the phase of the tool holder is determined, and when the phase of the tool holder is determined, the numerical controller rotates the spindle based on the information on the rotation direction of the spindle stored in the rotation direction storage unit.

(4) Preferably, the machine tool of any one of (1) to (3) includes a rotation position storage unit (for example, a RAM 303 which will be described later) which stores information on the rotation position of the spindle about an axis when the determination of the phase of the tool holder is completed, and after the determination of the phase of the tool holder is completed, the numerical controller compensates for the rotation position of the spindle based on the information on the rotation position stored in the rotation position storage unit.

According to the present invention, it is possible to provide a machine tool which can perform phase determination simply and reliably without changing existing machine facilities.

BRIEF DESCRIPTION OF THE DRAWINGS

FIG. 6A is a cross-sectional view corresponding to a cross section taken along line a-a in FIG. 5;

FIG. 9A is a schematic view showing a position relationship between keys and key grooves when the spindle 21 is rotated from the rotation position of phase determination;

FIG. 9B is a schematic view showing the position relationship between the keys and the key grooves when the spindle 21 is rotated from the rotation position of phase determination;

FIG. 9C is a schematic view showing the position relationship between the keys and the key grooves when the spindle 21 is rotated from the rotation position of phase determination;

FIG. 11 is a flowchart showing the procedure of processing for compensating for the rotation position of the spindle 21 when the tool holder 14 is removed.

DETAILED DESCRIPTION OF THE INVENTION

Figure 1:
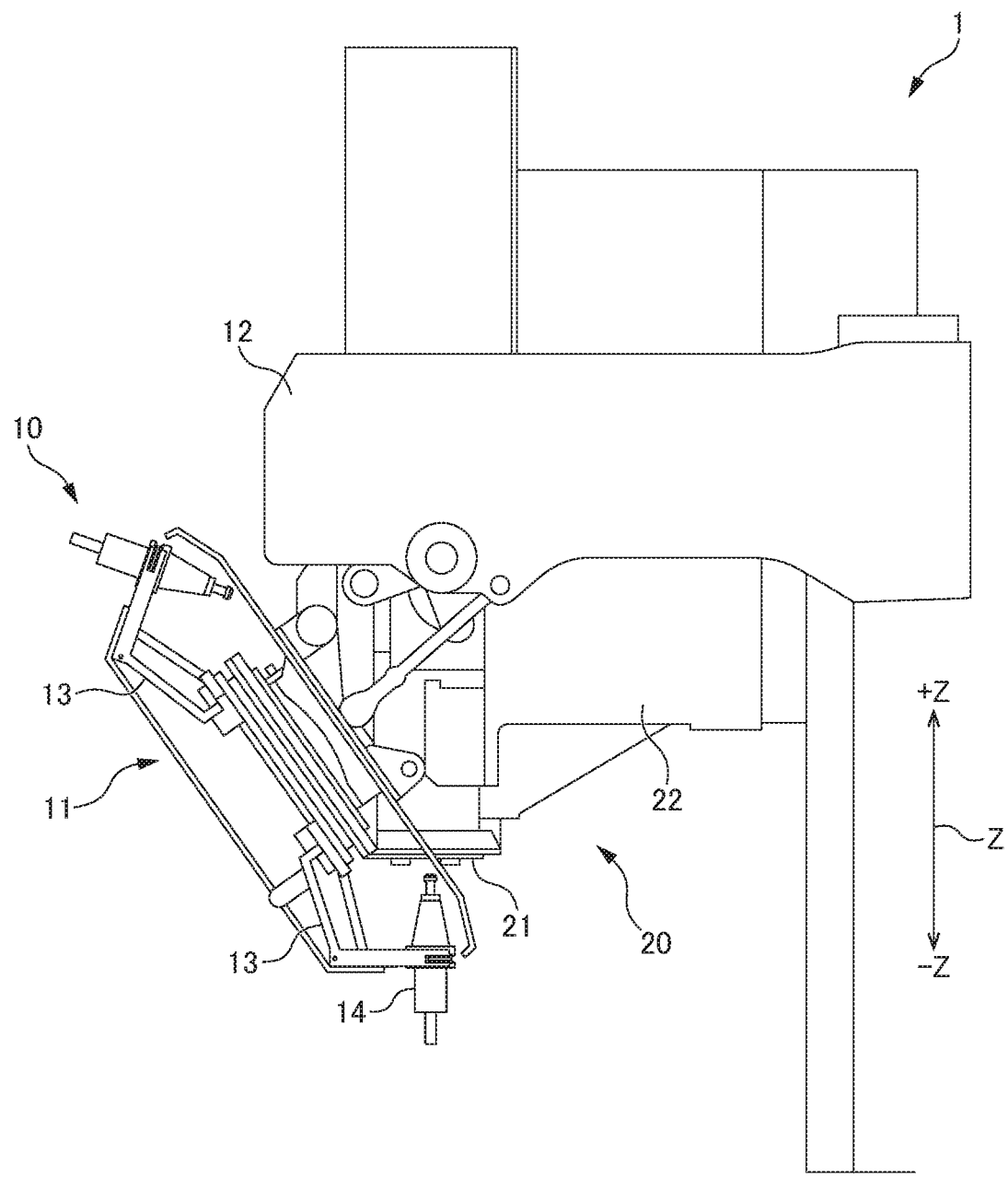
FIG. 1 is a conceptual view showing the configuration of the machine system of a machine tool 1 in an embodiment.

An embodiment of a machine tool according to the present invention will be described below. The drawings attached to the present specification each are a conceptual view or a schematic view, and with consideration given to ease of understanding and the like, the shapes, the scales, vertical and horizontal dimension ratios and the like of individual portions are changed or exaggerated from real ones. In the drawings, hatching which indicates the cross sections of members is omitted as necessary.

Figure 2:
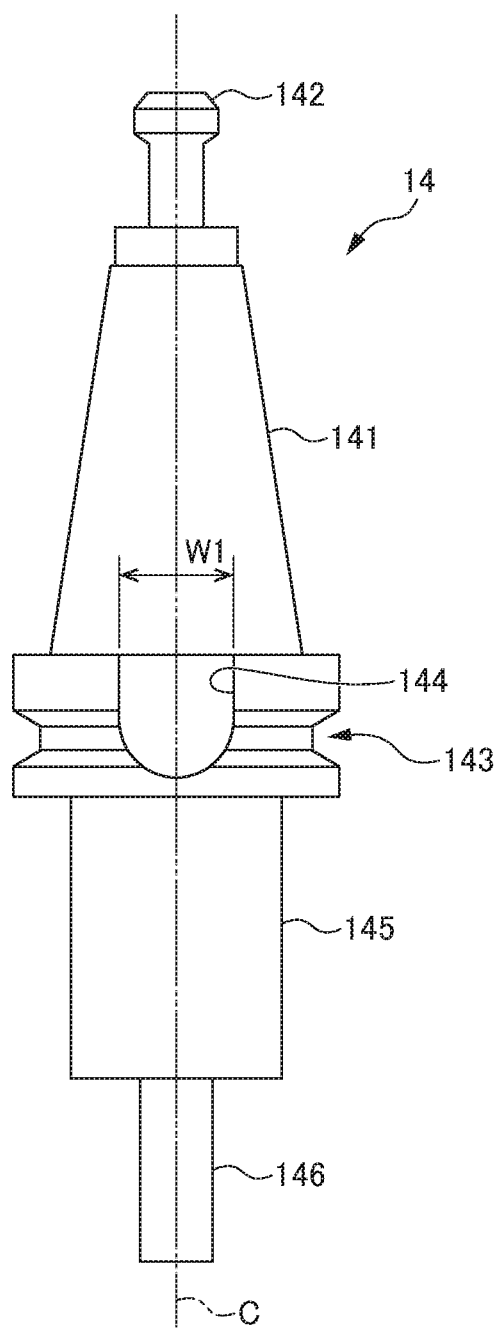
FIG. 2 is a side view of a tool holder 14.
Figure 3:
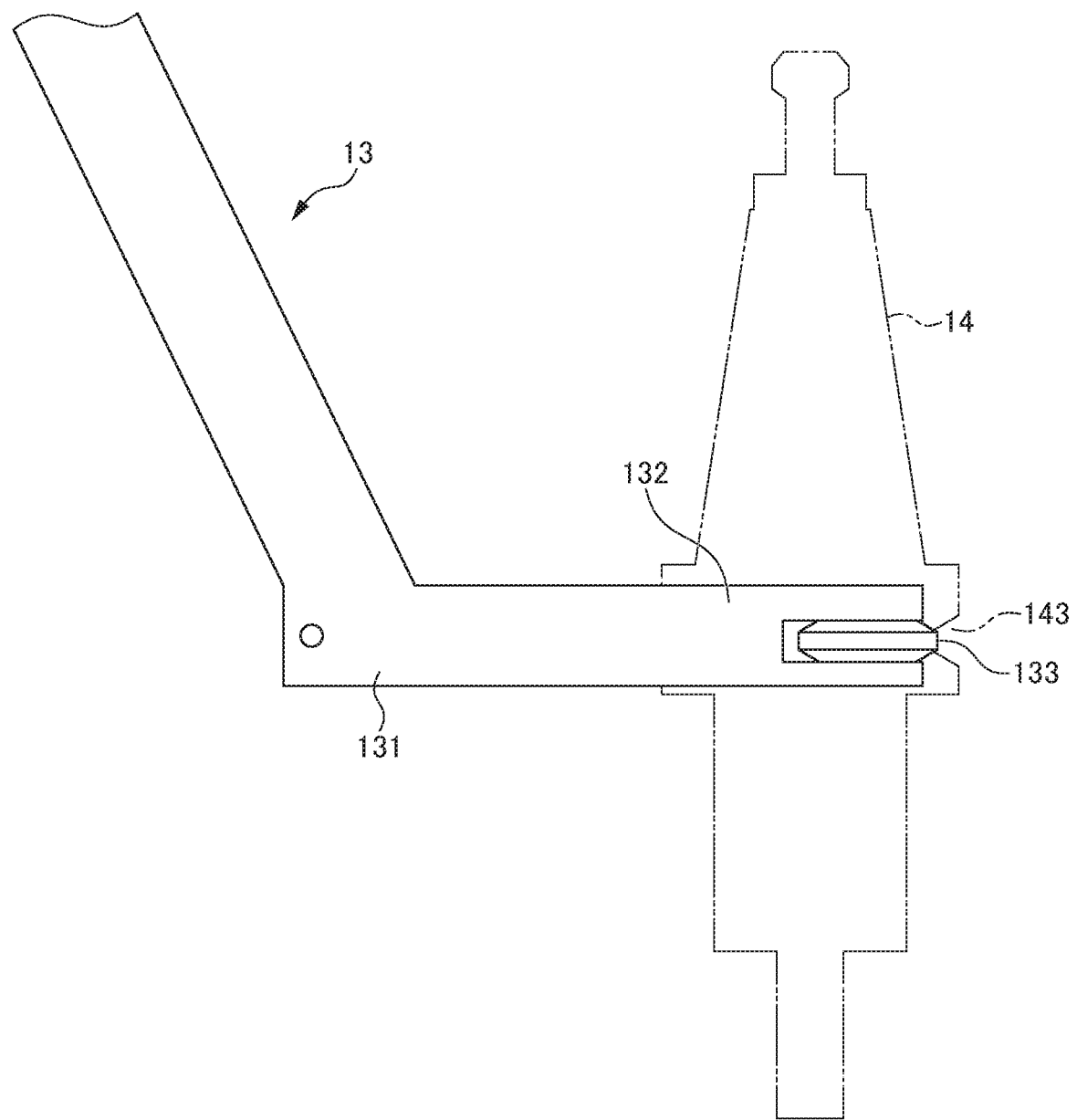
FIG. 3 is a side view of a grip 13.
Figure 4:
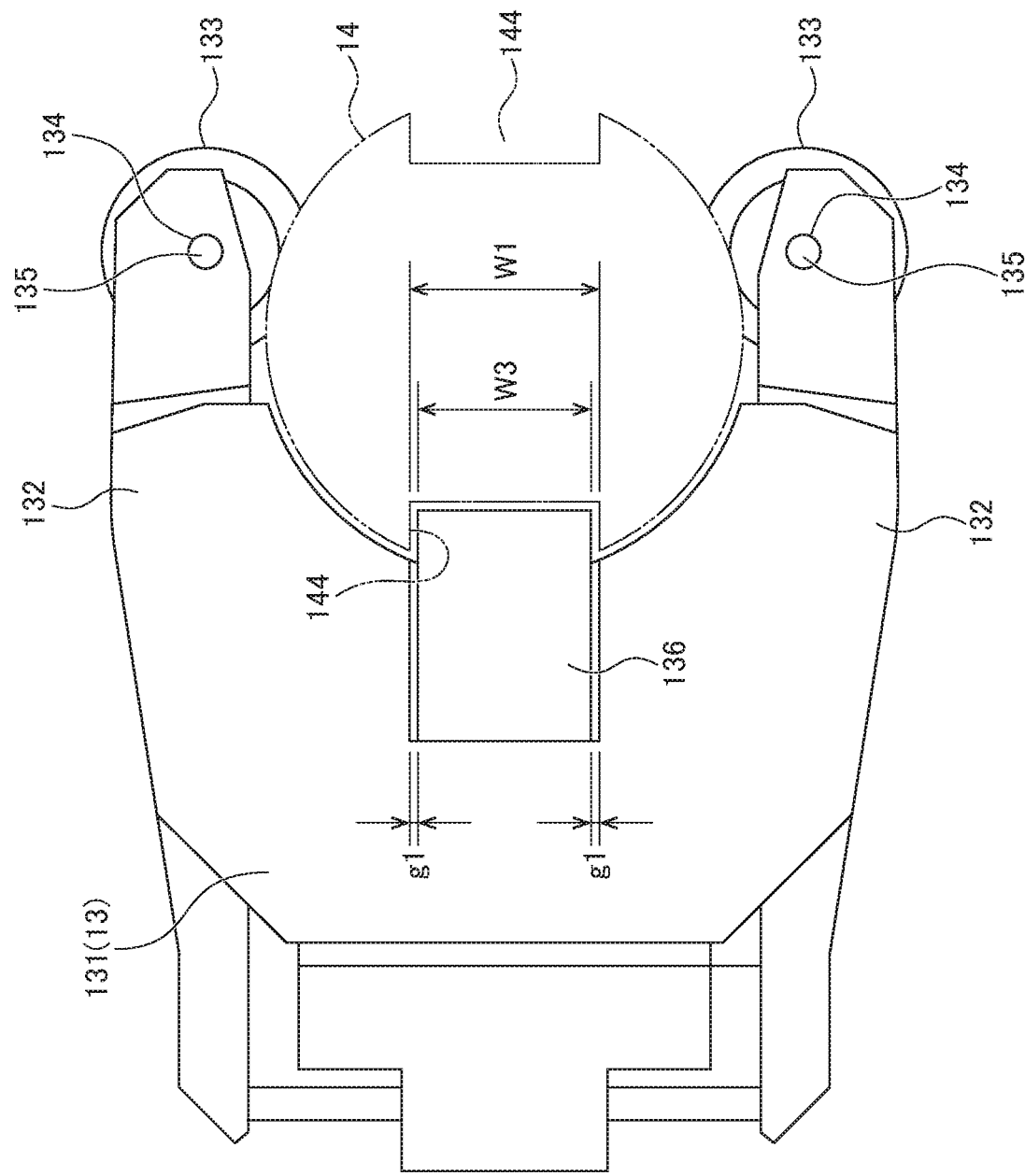
FIG. 4 is a plan view of the grip 13.
Figure 5:
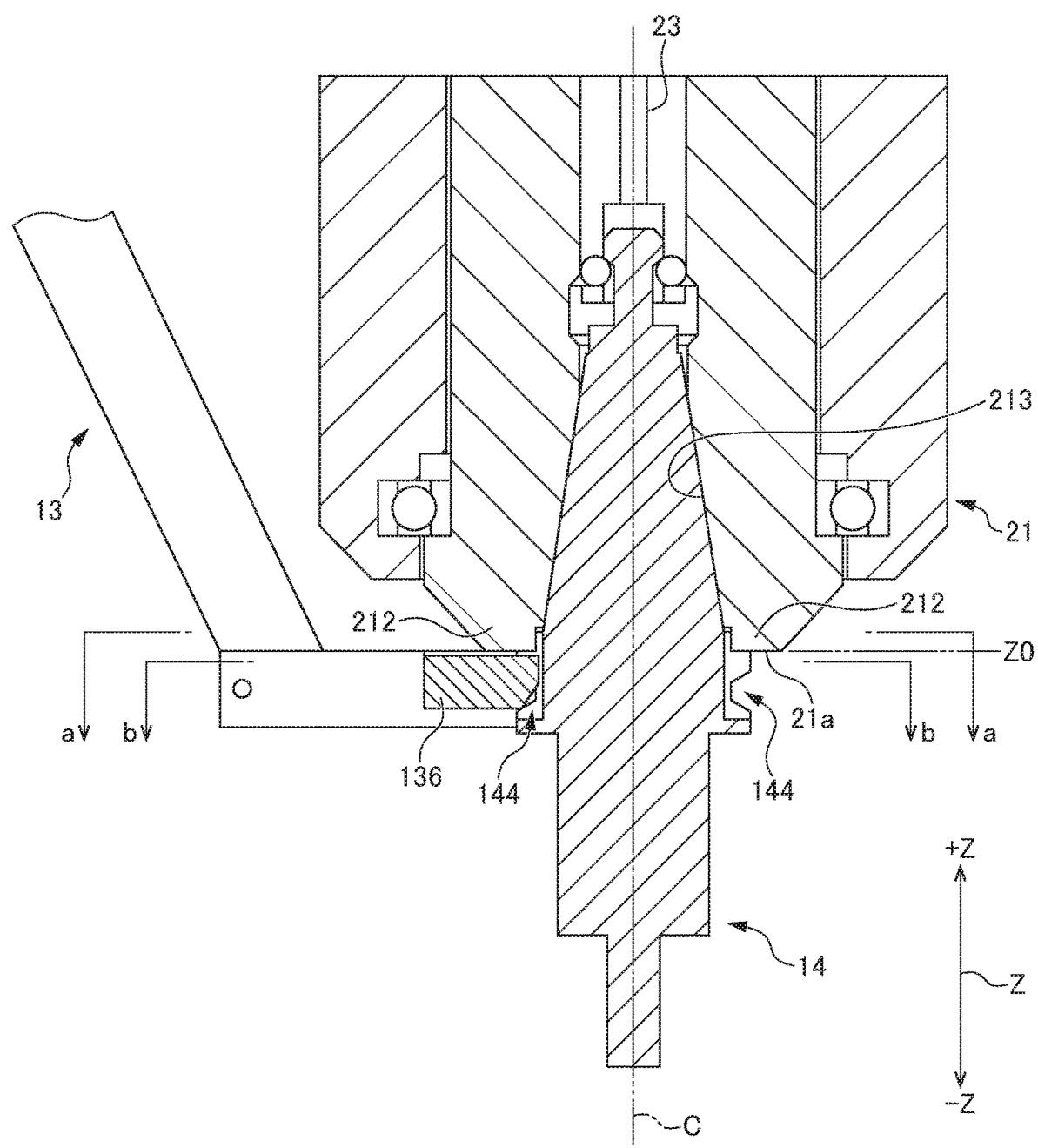
FIG. 5 is a cross-sectional view when the tool holder 14 held by the grip 13 is fitted to a spindle 21.
Figure 6B:
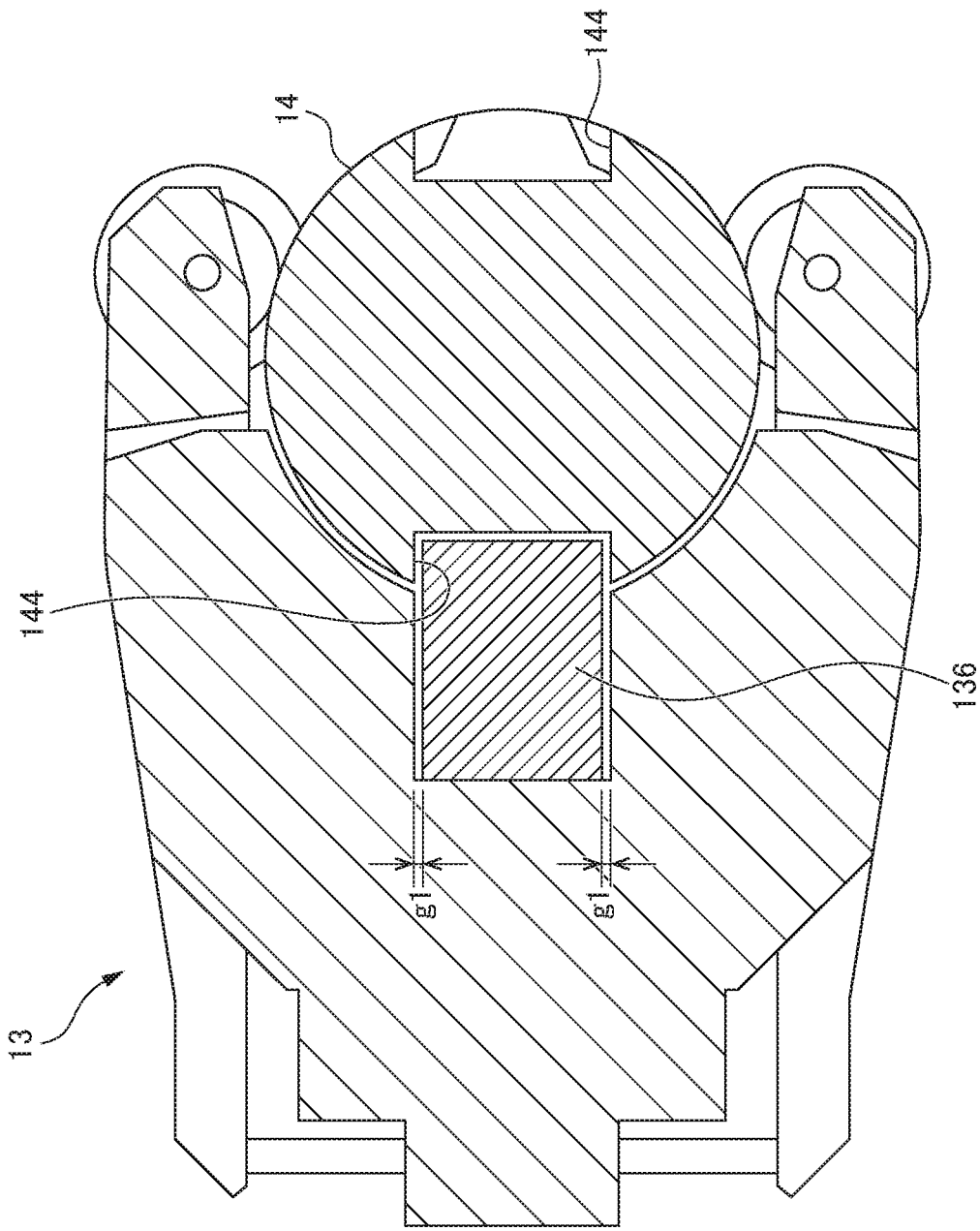
FIG. 6B is a cross-sectional view corresponding to a cross section taken along line b-b in FIG. 5.

FIG. 1 is a conceptual view showing the configuration of the machine system of a machine tool 1 in the present embodiment. FIG. 2 is a side view of a tool holder 14. FIG. 3 is a side view of a grip 13. FIG. 4 is a plan view of the grip 13. FIG. 5 is a cross-sectional view when the tool holder 14 held by the grip 13 is fitted to a spindle 21. FIG. 6A is a cross-sectional view corresponding to a cross section taken along line a-a in FIG. 5. FIG. 6B is a cross-sectional view corresponding to a cross section taken along line b-b in FIG. 5. In the present specification and the drawings, in a state where the machine tool 1 is installed on a floor surface or the like, a vertical direction is assumed to be a Z direction. It is assumed that in the Z direction, the upward direction is +Z direction and the downward direction is −Z direction.

As shown in FIG. 1, the machine tool 1 includes a tool exchanger 10, a machining device 20, a numerical controller 30 (see FIG. 7) and a support-movement mechanism for a workpiece (not shown). The tool exchanger 10 is a device which automatically changes the tool holder 14 (which will be described later) fitted to the spindle. The tool exchanger 10 includes, as a main configuration, a tool magazine 11 and a magazine support unit 12. The tool magazine 11 is a structure to which a plurality of grips 13 (which will be described later) are attached along the outer circumference thereof and which is substantially disc-shaped. The magazine support unit 12 is a device which supports the tool magazine 11 such that the tool magazine 11 is freely turned and which turns the tool magazine 11 so as to move the grip 13 to be changed to immediately below the spindle 21. In the present embodiment, the basic operation of the tool exchanger 10 which is controlled by the numerical controller 30 is substantially the same as a conventional tool exchanger.

The machining device 20 is a device which rotates and moves a tool fitted to the spindle 21 so as to machine the workpiece (not shown). The machining device 20 includes, as a main configuration, the spindle 21 and a spindle head 22. In the present embodiment, the spindle 21, the spindle head 22 and a control system (which will be described later) form a spindle drive unit. The spindle 21 is a portion that rotates the tool holder 14 to which the tool is attached and that holds the tool holder 14 with the tool holder 14 fixed. In the spindle 21, as shown in FIG. 5, spindle keys 212 are provided which can be fitted into the key grooves 144 of the tool holder 14. A pair of spindle keys 212 is provided in positions on opposite sides 180 degrees away from each other about the rotation axis C of the tool holder 14. In FIG. 5, the pair of spindle keys 212 is provided in a left/right direction in the plane of the figure. Within the spindle 21, a drawbar 23 is provided which serves as a clamp mechanism for the tool holder 14.

In FIG. 1, the spindle head 22 is a drive mechanism which rotates the spindle 21. The spindle head 22 includes a spindle motor 317 (see FIG. 7) which provides a rotation force to the spindle 21. When machining is performed with a rotary tool attached to the spindle 21, the spindle motor 317 functions as a spindle motor which is continuously rotated at high speed. On the other hand, when machining such as hale machining is performed with a fixed tool attached to the spindle 21, the spindle motor 317 functions as a device which controls the phase (rotation position) of the spindle 21. The spindle head 22 includes a raising/lowering mechanism (whose reference numeral is omitted) which raises and lowers the spindle 21 in the vertical direction (Z direction). The raising/lowering mechanism includes a servo motor 313 (see FIG. 7) and the like which vertically move the spindle 21 in the vertical direction (Z direction). The operation of the machining device 20 is controlled by the numerical controller 30 which will be described later.

The configuration of the tool holder 14 will then be described with reference to FIG. 2. In FIG. 2, the rotation axis C of the tool holder 14 coincides with the vertical direction (Z direction) when the tool holder 14 is moved to a position in which the tool holder 14 is fitted to the spindle 21. As shown in FIG. 2, the tool holder 14 includes a taper shank 141, a pull stud 142, a holding groove 143, the key groove 144, a holder head 145 and the tool 146.

The taper shank 141 is a portion which is fitted into the taper hole 213 (see FIG. 5) of the spindle 21 and which is substantially disc-shaped. The pull stud 142 is a portion which engages with the drawbar 23 provided within the spindle 21. The pull stud 142 is pulled up with the drawbar 23 in the upward direction (+Z direction) of the vertical direction, and thus the tool holder 14 is held within the spindle 21. The pull stud 142 is pulled down with the drawbar 23 in the downward direction (−Z direction) of the vertical direction, and thus the fitting of the tool holder 14 to the spindle 21 is released, with the result that the tool holder 14 can be removed.

The holding groove 143 is a portion which is held by the grip 13 (which will be described later). The holding groove 143 is a groove (V-shaped groove) which is formed substantially in the shape of the letter V when seen in cross section orthogonal to the rotation axis C. The holding groove 143 is formed annularly along the outer circumference of the tool holder 14. As will be described later, the key grooves 144 are grooves which are fitted to the spindle keys 212 provided in the spindle 21 and the grip key 136 (see FIG. 5) of the grip 13. A pair of key grooves 144 is provided in positions on opposite sides 180 degrees away from each other about the rotation axis C of the tool holder 14. In FIG. 2, in the tool holder 14, the key groove 144 which is provided on the front side of the plane of the figure is shown, and the key groove which is provided on the back side of the plane of the figure is hidden so as not to be shown. The holder head 145 is a portion which holds the tool 146. As the tool 146, for example, a drill, an endmill, a tap, a hale tool or a trimmer is used.

In the tool holder 14, as shown in FIG. 4, the width W1 of the key groove 144 is set slightly greater than the width W3 of the grip key 136 (the grip 13) which will be described later. Hence, when the grip key 136 is located in the center of the key groove 144, between each of the side surfaces of the grip key 136 on sides and the key groove 144 of the tool holder 14, a gap g1 is formed. As shown in FIG. 6A, the width W1 of the key groove 144 is also set slightly greater than the width W2 of the spindle key 212 (the spindle 21). Hence, when the spindle key 212 is located in the center of the key groove 144, between each of the side surfaces of the spindle key 212 on sides and the key groove 144 of the tool holder 14, a gap g2 is formed.

The configuration of the grip 13 provided in the tool magazine 11 will then be described. As shown in FIG. 3, the grip 13 includes holding arms 132 on the tip side of an arm main body 131. As shown in FIG. 4, a pair of holding arms 132 is provided so as to sandwich the tool holder 14 from both sides. Each of the pair of holding arms 132 includes a holding roller 133 at a tip portion. The holding roller 133 is a part which engages with the holding groove 143 (V-shaped groove) of the tool holder 14 and which is disc-shaped.

A fixing pin 135 is press-fitted so as to penetrate a hole portion 134 provided at a tip of the holding arm 132 and an axis hole (not shown) provided in the center of the holding roller 133, and thus the holding roller 133 is fixed. The pair of holding arms 132 are biased in directions (inward) opposite each other with an elastic member (not shown) provided within the arm main body 131. The arm main body 131 includes the grip key 136 in the vicinity of the center portion. The grip key 136 is a protrusion for locating the tool holder 14 held between the holding arms 132.

In FIG. 4, the tool holder 14 is inserted between the pair of holding arms 132, and thus the holding rollers 133 provided at the tips of the holding arms 132 engage with the holding groove 143 of the tool holder 14, and the key groove 144 of the tool holder 14 engages with the grip key 136. In this state, the tool holder 14 is held between the pair of holding arms 132 which are biased in directions opposite each other. The key groove 144 of the tool holder 14 engages with the grip key 136, and thus the rotation of the tool holder 14 about the direction of the axis thereof is reduced. As described above, since the gaps g1 are provided between the key groove 144 and the grip key 136, the spindle 21 is rotated in a state shown in FIG. 4, and thus a state where the key groove 144 of the tool holder 14 are pressed to the side surface of the grip key 136 is reliably formed.

The fitting of the keys and the key grooves when the tool holder 14 held by the grip 13 is fitted to the spindle 21 will then be described. As shown in FIG. 5, in a state where the tool holder 14 held by the grip 13 is fitted to the spindle 21, the spindle keys 212 of the spindle 21 and the grip key 136 of the grip 13 are fitted to the key grooves 144 of the tool holder 14.

Specifically, as shown in FIG. 6A, the pair of spindle keys 212 provided in the spindle 21 is individually fitted to the pair of key grooves 144 provided in the tool holder 14. When the spindle 21 and the tool holder 14 are in a position relationship as shown in FIG. 6A, the gaps g2 are individually formed between the side surfaces of the spindle key 212 on the sides and the key groove 144 of the tool holder 14. As shown in FIG. 6B, the grip key 136 provided in the grip 13 is fitted into one of the key grooves 144 provided in the tool holder 14. When the grip 13 and the tool holder 14 are in a position relationship as shown in FIG. 6B, the gaps g1 are individually formed between the side surfaces of the grip key 136 on the sides and the key groove 144 of the tool holder 14.

After the tool holder 14 is fitted to the spindle 21, the grip 13 provided in the tool magazine 11 is moved to a position separated from the tool holder 14. Hence, each time the tool holder 14 is changed, even when the gaps g1 produced between the grip key 136 and the tool holder 14 differ, the position of phase determination is not affected. However, each time the tool holder 14 is changed, when the gaps g2 produced between the tool holder 14 and the spindle 21 differ, the position of phase determination is affected. Hence, in the machine tool 1 of the present embodiment, as will be described later, control is performed such that when the tool holder 14 is fitted to the spindle 21, the spindle 21 is rotated to press the spindle keys 212 to the key grooves 144 of the tool holder 14, and thus the position of determination of the phase of the tool holder 14 with respect to the spindle 21 is constantly the same.

Figure 7:
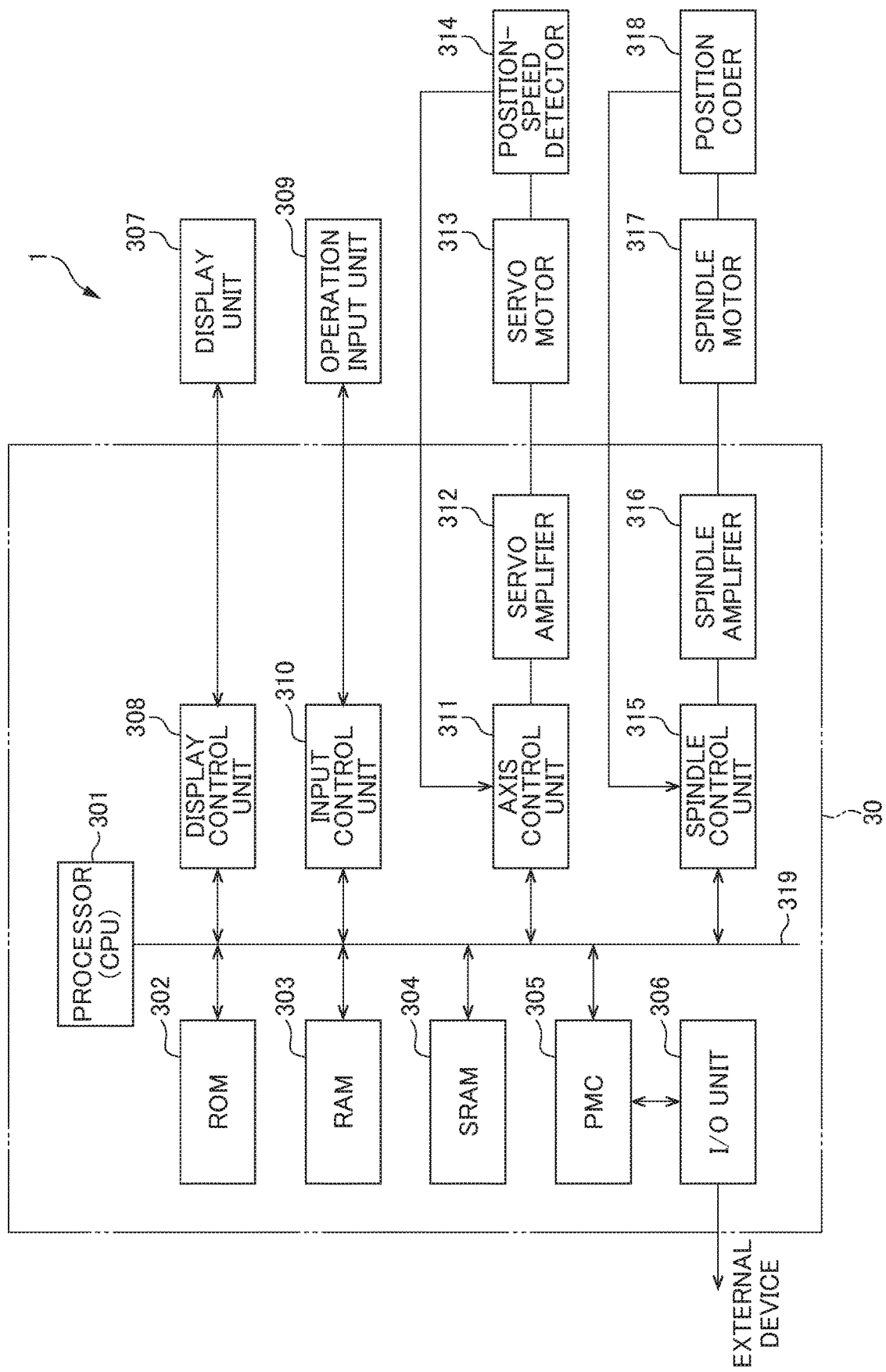
FIG. 7 is a block diagram showing the electrical configuration of a numerical controller 30.

The configuration of the numerical controller 30 will then be described. FIG. 7 is a block diagram showing the electrical configuration of the numerical controller 30. The numerical controller 30 is a device which controls the tool exchanger 10 and the machining device 20 so as to make the machine tool 1 perform predetermined machining. The numerical controller 30 generates, for example, based on machining programs, operation commands including movement commands for individual axes and rotation commands for motors which drive individual portions, and transmits the operation commands to the tool exchanger 10 and the machining device 20. In this way, the numerical controller 30 controls the motors provided in individual devices so as to perform the machining on the machine tool 1.

As shown in FIG. 7, the numerical controller 30 includes a processor 301, a ROM 302, a RAM 303, an SRAM 304, a PMC 305, an I/O unit 306, a display unit 307, a display control unit 308, an operation input unit 309, an input control unit 310, an axis control unit 311, a servo amplifier 312, a spindle control unit 315 and a spindle amplifier 316, and the individual units are electrically connected to each other directly or indirectly through a bus 319. The servo motor 313, a position-speed detector 314, a spindle motor 317 and a position coder 318 are electrically connected to the numerical controller 30.

The processor (CPU) 301 reads a system program stored in the ROM 302 so as to control the entire numerical controller 30 according to the system program. When a command for determining the phase of the tool is provided at the time of change of the tool, the processor 301 performs phase determination processing which will be described later. In the RAM 303, calculation data, display data and various types of data input by an operator which are used by the processor 301 are temporarily stored. In the present embodiment, the RAM 303 functions as a load threshold value storage unit which stores a threshold value for a load torque (load torque threshold value Tth) added to the spindle 21, a rotation direction storage unit which stores information on the rotation direction of the spindle 21 when the phase determination of the tool holder 14 is performed and a rotation position storage unit which stores information (spindle phase position θ) on the rotation position of the spindle 21 when the phase determination of the tool holder 14 is completed. The SRAM 304 is configured as a non-volatile memory in which even when the power of the numerical controller 30 is turned off, details stored are held.

The PMC (Programmable Machine Controller) 305 controls the tool exchanger 10 and the machining device 20 according to a sequence, machining conditions and the like specified by a sequence program incorporated in the numerical controller 30. The PMC 305 outputs, through the I/O unit 306, various types of signals converted by the sequence program to the tool exchanger 10 and the machining device 20 which are located externally. The PMC 305 acquires a signal input from the operation input unit 309 by the operator, performs predetermined signal processing and thereafter delivers it to the processor 301.

The display unit 307 is a display device which can display various types of data, details of settings, the state of an operation and the like. The display control unit 308 controls the details of the display of the display unit 307. The operation input unit 309 is a device with which the operator can input various types of setting data, numerical data, operation instructions and the like. The operation input unit 309 is formed with, for example, a keyboard, a mouse and a touch panel (not shown). The input control unit 310 acquires data, instructions and the like input from the operation input unit 309 and stores them in the ROM 302, the RAM 303 and the like.

The axis control unit 311 controls the movement of the spindle head 22 in an up/down direction (Z direction). The axis control unit 311 receives a movement command amount from the processor 301 so as to output a torque command value to the servo amplifier 312. The servo amplifier 312 supplies a drive current to the servo motor (Z axis motor) 313 according to the torque command value output from the axis control unit 311. The position-speed detector 314 detects the position and the speed of the servo motor 313 so as to output a position-speed feedback signal to the axis control unit 311. The axis control unit 311 performs, based on the position-speed feedback signal output from the position-speed detector 314, feedback control on the position and the speed of the servo motor 313.

The spindle control unit 315 controls the rotation of the spindle 21. The spindle control unit 315 receives a spindle rotation command from the processor 301 so as to output a spindle speed signal to the spindle amplifier 316. The spindle amplifier 316 drives the spindle motor 317 at a rotation speed commanded with the spindle speed signal. The position coder 318 outputs, to the spindle control unit 315, a feedback pulse synchronous to the rotation of the spindle motor 317. The spindle control unit 315 performs, based on the feedback pulse output from the position coder 318, feedback control on the speed of the spindle motor 317. In the processor (not shown) of the spindle control unit 315, a disturbance (estimation) observer is incorporated. The spindle control unit 315 determines the load torque of the spindle 21 with the disturbance observer. Since the spindle control unit 315 monitors a current value supplied to the spindle motor 317, the load torque may be calculated from the current value. As described above, in the numerical controller 30 of the present embodiment, a sensor or the like for measuring the load torque of the spindle 21 does not need to be provided in the spindle 21, the spindle motor 317 or both of them, with the result that the numerical controller 30 can easily be applied to existing machine tools. In FIG. 7, only the motor and the control system thereof for moving the spindle head 22 in the up/down direction and the motor and the control system thereof for rotating the spindle 21 are shown, and an X axis motor, a Y axis motor, a tool magazine motor and the control system thereof are omitted.

Figure 8:
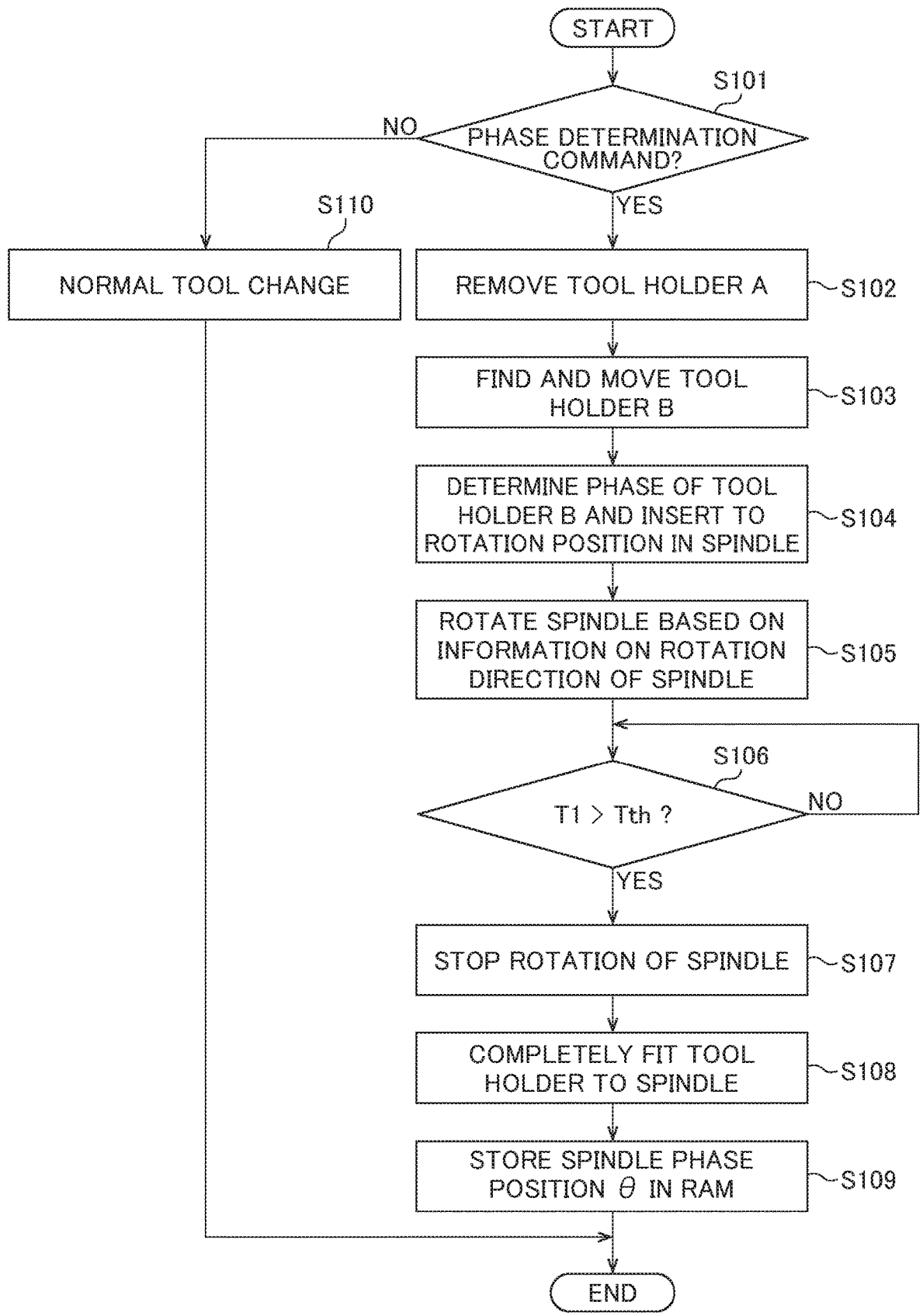
FIG. 8 is a flowchart showing the procedure of tool change processing which is performed in the numerical controller 30.

Tool change processing which is performed in the numerical controller 30 of the present embodiment will then be described. FIG. 8 is a flowchart showing the procedure of the tool change processing which is performed in the numerical controller 30. The processor 301 analyzes the machining programs stored in the ROM 302 based on the system program, and thus the tool change processing shown in FIG. 8 is performed. Part or all of control by the processor 301 which will be described below may be performed in the PMC 305 (see FIG. 7).

Figure 10:
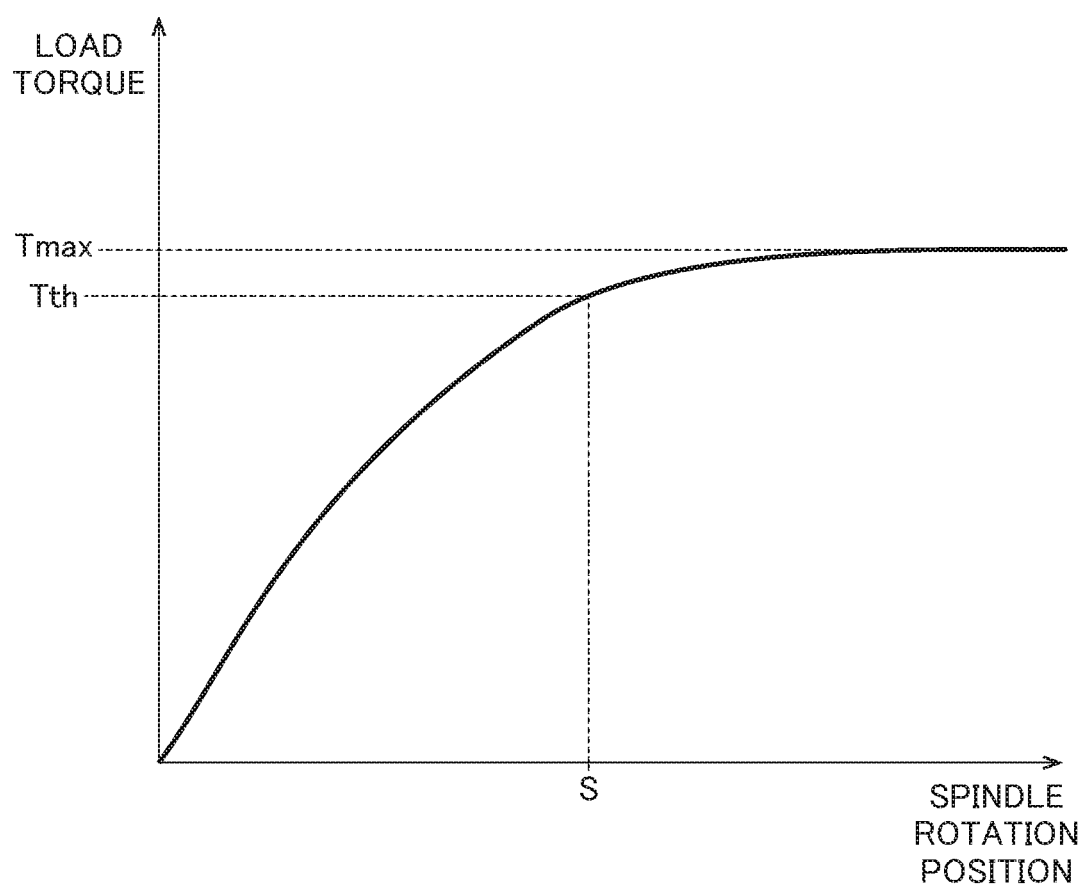
FIG. 10 is a conceptual view showing a relationship between the rotation position of the spindle 21 and a load torque added to the spindle 21.

FIGS. 9A to 9C are schematic views showing a position relationship between the keys and the key grooves when the spindle 21 is rotated from the rotation position of phase determination. FIGS. 9A and 9B show the position relationship between the spindle keys 212 and the key grooves 144 of the tool holder 14. FIG. 9C shows the position relationship between the grip key 136 and the key groove 144 of the tool holder 14. FIG. 10 is a conceptual view showing a relationship between the rotation position of the spindle 21 and the load torque added to the spindle 21.

In step S101 shown in FIG. 8, the processor 301 determines whether or not the command for determining the phase of the tool is provided. When in step S101, the processor 301 determines that the command for determining the phase of the tool is provided, the processing is transferred to step S102. On the other hand, when in step S101, the processor 301 determines that the command for determining the phase of the tool is not provided, the processing is transferred to step S10.

In step S110 (step S101: no), the processor 301 controls the tool magazine 11, the spindle head 22 and the like so as to perform normal tool change. In the normal tool change, the tool holder 14 is fitted to the spindle 21 without the phase of the tool holder 14 being determined. After the processing in step S110 is completed, the processing in the present flowchart is completed.

In step S102 (step S101: yes), the processor 301 controls the tool magazine 11, the spindle head 22 and the like so as to remove the tool holder (hereinafter also referred to as the "tool holder A") 14 which is currently fitted. When in the preceding tool change, the phase of the tool holder 14 is determined, in step S102, as will be described later, processing for compensating for the rotation position of the spindle 21 is performed. In step S103, the processor 301 controls the tool magazine 11 so as to find the specified tool holder (hereinafter also referred to as the "tool holder B") 14 and to move it to the position of change.

In step S104, the processor 301 controls the spindle head 22 so as to insert the tool holder 14 moved to the position of change up to the rotation position of phase determination in the spindle 21. In the machine tool 1 of the present embodiment, as shown in FIG. 1, the spindle head 22 is moved in the downward direction (−Z direction) with respect to the tool holder 14 held by the grip 13 (the tool magazine 11), and thus the tool holder 14 is inserted into the spindle 21. The tool holder 14 may be moved in the upward direction with respect to the spindle 21 so as to insert the tool holder 14 into the spindle 21.

The rotation position of phase determination refers to a position in which the spindle keys 212 are fitted into the key grooves 144 of the tool holder 14 and in which the taper hole 213 of the spindle 21 is not in contact with the taper shank 141 of the tool holder 14. FIG. 5 which is previously described shows a state where the tool holder 14 is completely fitted to the spindle 21. When in the fitted state described above, the position of an end surface 21a of the spindle 21 in the vertical direction (Z direction) is assumed to be Z0, for example, a position which is separated from the position of Z0 only by 1.0 mm (+Z direction) is the rotation position of phase determination. As described above, when the position in which the spindle 21 is not in contact with the tool holder 14 is assumed to be the rotation position of phase determination, frictional resistance is not produced between the taper hole 213 of the spindle 21 and the taper shank 141 of the tool holder 14, with the result that it is possible to more accurately measure the load torque applied to the spindle 21.

The rotation position of phase determination is not limited to this example, and for example, the rotation position of phase determination may be a position in which the taper hole 213 of the spindle 21 is in slight contact with the taper shank 141 of the tool holder 14. In other words, as long as the spindle 21 is rotated such that the spindle keys 212 can be pressed to the key grooves 144 of the tool holder 14, in the rotation position of phase determination, the taper hole 213 of the spindle 21 may be in contact with the taper shank 141 of the tool holder 14.

In step S105, the processor 301 acquires, from the RAM 303, the information on the rotation direction of the spindle 21 when phase determination is performed. Then, the processor 301 controls the spindle motor 317 (see FIG. 7) so as to rotate the spindle 21 in a preset rotation direction.

Here, the position relationship between the keys and the key grooves when the spindle 21 is rotated in the rotation position of phase determination will be described with reference to FIGS. 9A to 9C. As shown in FIG. 9A, the gaps are present between the spindle keys 212 and the tool holder 14 of the key grooves 144 before the spindle 21 is rotated in the rotation position of phase determination, and thus the spindle keys 212 are not in contact with the key grooves 144. Although FIG. 9A shows an example where in the rotation position of phase determination, the spindle keys 212 are located in the centers of the key grooves 144, in actuality, such a position relationship is not always achieved, and the spindle keys 212 may be in contact with the key grooves 144.

Then, when the spindle 21 is rotated clockwise (the direction of arrows in the figure) from the rotation position of phase determination shown in FIG. 9A, as shown in FIG. 9B, the side surface of both or one of the two spindle keys 212 is pressed to the key groove 144 of the tool holder 14 (portion a in the figure). FIG. 9B shows a state where the side surfaces of both of the two spindle keys 212 are pressed to the key grooves 144 of the tool holder 14. When the spindle 21 is rotated clockwise, the key grooves 144 of the tool holder 14 are pressed by the spindle keys 212, and thus the tool holder 14 is also rotated clockwise. The spindle 21 may be rotated counterclockwise. In such a case, the side surfaces of the spindle keys 212 are pressed to the key grooves 144 of the tool holder 14 on the side opposite to FIG. 9B.

When the tool holder 14 is rotated clockwise, as shown in FIG. 9C, one side surface of the grip key 136 (the grip 13) is pressed to the key groove 144 of the tool holder 14 (portion b in the figure). The grip 13 which holds the grip key 136 is fixed to the tool magazine 11. Hence, when the one side surface of the grip key 136 is pressed to the key groove 144 of the tool holder 14, the rotation of the spindle 21 together with the tool holder 14 is prevented, with the result that the load torque applied to the spindle 21 is gradually increased.

With reference back to FIG. 8, the tool change processing will be described. In step S106 shown in FIG. 8, the processor 301 acquires the value of the load torque of the spindle 21 (hereinafter also referred to as the "load torque value T1") which is determined in the spindle control unit 315 (see FIG. 7). The processor 301 also acquires a threshold value for the load torque (hereinafter also referred to as the "load torque threshold value Tth") from the RAM 303. Then, the processor 301 determines whether or not the load torque value T1 exceeds the load torque threshold value Tth. The load torque value T1 is varied in real time. Hence, the processor 301 acquires the load torque value T1, for example, every several milliseconds so as to make the determination described above.

As shown in FIG. 10, the load torque of the spindle 21 is increased in proportion to the rotation position of the spindle 21. However, when the grip key 136 is pressed to the key groove 144 of the tool holder 14 so as to prevent the rotation of the spindle 21, the increase in the load torque is then reduced, and a substantially constant load torque value Tmax remains thereafter. Hence, a value which is slightly lower than the load torque value Tmax is assumed to be the load torque threshold value Tth, and thus when the load torque value T1 exceeds the load torque threshold value Tth, it can be considered that the spindle 21 is rotated to the position in which the spindle keys 212 are pressed to the key grooves 144 of the tool holder 14. In FIG. 10, a spindle rotation position S indicates a position where the position in which the spindle keys 212 are pressed to the key grooves 144 of the tool holder 14 is considered to be reached.

With reference back to FIG. 8, the tool change processing will be described. When in step S106 shown in FIG. 8, the processor 301 determines that the load torque value T1 does not exceed the load torque threshold value Tth, the processing is transferred to step S106. On the other hand, when the processor 301 determines that the load torque value T1 exceeds the load torque threshold value Tth, the processing is transferred to step S107.

In step S107 (step S106: yes), the processor 301 controls the spindle motor 317 so as to stop the rotation of the spindle 21. In step S107, the rotation of the spindle 21 is stopped, and thus the phase determination of the tool holder 14 is completed. In step S108, the processor 301 controls the tool magazine 11, the spindle head 22 and the like so as to completely fit the tool holder 14 to the spindle 21.

In step S109, the processor 301 stores, in the RAM 303, information (spindle phase position θ) on the rotation position of the spindle 21 when the phase determination of the tool holder 14 is completed. In the present embodiment, the spindle phase position θ is the rotation angle of the spindle 21 until the stop of the rotation of the spindle 21 in step S107 after the rotation of the spindle 21 in step S105. The spindle phase position θ will be referenced in the removal processing of the tool holder 14 which will be described later. After the processing in step S109 is completed, the processing in the present flowchart is completed.

Processing for compensating for the rotation position of the spindle 21 in step S102 will then be described. FIG. 11 is a flowchart showing the procedure of the processing for compensating for the rotation position of the spindle 21 when the tool holder 14 is removed. The processing shown in FIG. 11 is performed, in the flowchart (main routine) shown in FIG. 8, as the subroutine of step S102. In step S201 shown in FIG. 11, the processor 301 acquires, from the RAM 303, the information on the rotation direction of the spindle 21 when the phase determination is performed.

In step S202, the processor 301 acquires the spindle phase position θ from the RAM 303 as the information on the rotation position of the spindle 21 when the phase determination of the tool holder 14 is completed. In step S203, the processor 301 calculates a half value (θ/2) of the spindle phase position θ. Then, the processor 301 controls the spindle motor 317 so as to rotate the spindle 21 only by the half value in a direction opposite to the rotation direction when the phase determination is performed. In step S04, the processor 301 controls the tool magazine 11, the spindle head 22 and the like so as to remove the tool holder 14 which is currently fitted. After the processing in step S204 is completed, the processing is again returned to the main routine shown in FIG. 8.

According to the machine tool 1 of the present embodiment described above, the following effects are achieved. In the machine tool 1, when the tool holder 14 is fitted to the spindle 21, the spindle 21 is rotated in a state where the tool holder 14 is inserted up to the rotation position of phase determination in the spindle 21, and thus the spindle keys 212 are pressed to the key grooves 144 of the tool holder 14, with the result that the phase of the tool holder 14 with respect to the spindle 21 is determined. In this way, the position of phase determination of the changed tool holder 14 with respect to the rotation direction of the spindle 21 is constantly the same, and thus in the machining in which the spindle head 22 is moved with the spindle 21 fixed, it is possible to make the positions of the workpiece and the tool coincide with each other more accurately. Since in the machine tool 1, it is not necessary to add an elastic member to the key groove of the tool holder 14 or a tapered surface, the lowering of rigidity of individual portions thereof can be reduced. Hence, according to the machine tool 1 of the present embodiment, it is possible to perform phase determination simply and reliably without changing existing machine facilities.

When the machine tool 1 rotates the spindle 21, the machine tool 1 rotates the spindle 21 based on a state on the rotation direction of the spindle 21. In this way, the phase determination of the changed tool holder 14 with respect to the rotation direction of the spindle 21 can be performed constantly at the position of the same direction, and thus it is possible to more enhance the accuracy of phase determination.

After the machine tool 1 rotates the spindle 21, the machine tool 1 determines, based on the load torque value T1 applied to the spindle 21 and the load torque threshold value Tth, whether or not the phase determination of the tool holder 14 is completed. Hence, in the machine tool 1, it is possible to more accurately and reliably identify that the spindle keys 212 are pressed to the key grooves 144 of the tool holder 14.

In the machine tool 1, when the tool holder 14 is changed, the spindle 21 is rotated in the direction opposite to the rotation direction when the phase determination is performed, and thus the rotation position of the spindle 21 is compensated for. In this way, when the tool holder 14 is removed, the tool holder 14 is prevented from being removed while the key grooves 144 of the tool holder 14 are being in contact with the spindle keys 212 and the grip key 136, with the result that the wear of the key grooves 144 in the tool holder 14 can be reduced. Hence, it is possible to perform highly accurate phase determination for a long period of time.

Although the embodiment of the present invention is described above, the present invention is not limited to the embodiment described above, and various variations and modifications such as variations which will be described later are possible, and they are also included in the technical range of the present invention. The effects described in the embodiment are simply a list of the most preferred effects produced from the present invention, and there is no limitation to those described in the embodiment. Although the embodiment described above and variations which will be described later can be used by being combined as necessary, the detailed description thereof will be omitted.

Variations

Although in the embodiment, the example is described where based on the load torque value T1 applied to the spindle 21 and the load torque threshold value Tth, whether or not the phase determination of the tool holder 14 is completed is determined, there is no limitation to this example. When after the rotation of the spindle 21, the spindle 21 is rotated to a predetermined rotation position, the phase determination of the tool holder 14 may be completed or when after the spindle 21 is rotated for a predetermined time, the phase determination of the tool holder 14 may be completed. It may be detected with a sensor or the like that the spindle keys 212 are pressed to the key grooves 144 of the tool holder 14.

Although in the embodiment, the example is described where the spindle phase position θ is used as the information on the rotation position of the spindle 21 when the phase determination of the tool holder 14 is completed, there is no limitation to this example. Instead of storing the spindle phase position θ, an angle at which the spindle 21 is rotated in the opposite direction may be previously set, and instead of removing the tool holder 14, the spindle 21 may be rotated only by this angle.

EXPLANATION OF REFERENCE NUMERALS

1: machine tool, 10: tool exchanger, 11: tool magazine, 13: grip, 14: tool holder, 20: machining device, 21: spindle, 22: spindle head, 23: drawbar, 30: numerical controller, 136: grip key, 141: taper shank, 144: key groove, 146: tool, 212: spindle key, 301: processor, 302: ROM, 303: RAM (load threshold value storage unit, rotation direction storage unit, rotation position storage unit), 304: SRAM, 305: PMC, 311: axis control unit, 313: servo motor, 314: position-speed detector, 315: spindle control unit, 317: spindle motor, 318: position coder

What is claimed is:

1. A machine tool, comprising:
a tool holder which includes a tool and a key groove;
a spindle drive unit which includes a spindle key that can be fitted into the key groove of the tool holder and a spindle and which removably holds the tool holder;
a tool exchanger which includes a grip key that can be fitted into the key groove of the tool holder and a grip that holds the tool holder at a fixed position with respect to the spindle;
a numerical controller which controls the tool exchanger so as to fit and remove the tool holder with respect to the spindle; and
a load threshold value storage unit which stores a threshold value for a load applied to the spindle,
wherein the numerical controller controls the spindle drive unit such that when the tool holder held by the grip is fitted to the spindle, in a state where at least the key groove of the tool holder is inserted in the spindle key, the spindle is rotated to press the spindle key to the key groove of the tool holder so as to determine a phase of the tool holder with respect to the spindle, and wherein when the phase of the tool holder is determined, the numerical controller determines, based on the load applied to the spindle and the threshold value for the load stored in the load threshold value storage unit, whether or not the determination of the phase of the tool holder is completed.

2. A machine tool, comprising:

a tool holder which includes a tool and a key groove;

a spindle drive unit which includes a spindle key that can be fitted into the key groove of the tool holder and a spindle and which removably holds the tool holder;

a tool exchanger which includes a grip key that can be fitted into the key groove of the tool holder and a grip that holds the tool holder at a fixed position with respect to the spindle;

a numerical controller which controls the tool exchanger so as to fit and remove the tool holder with respect to the spindle; and a rotation direction storage unit which stores information on a rotation direction of the spindle when the phase of the tool holder is determined, wherein the numerical controller controls the spindle drive unit such that when the tool holder held by the grip is fitted to the spindle, in a state where at least the key groove of the tool holder is inserted in the spindle key, the spindle is rotated to press the spindle key to the key groove of the tool holder so as to determine a phase of the tool holder with respect to the spindle, and wherein when the phase of the tool holder is determined, the numerical controller rotates the spindle based on the information on the rotation direction of the spindle stored in the rotation direction storage unit.

3. A machine tool, comprising:

a tool holder which includes a tool and a key groove;

a spindle drive unit which includes a spindle key that can be fitted into the key groove of the tool holder and a spindle and which removably holds the tool holder;

a tool exchanger which includes a grip key that can be fitted into the key groove of the tool holder and a grip that holds the tool holder at a fixed position with respect to the spindle;

a numerical controller which controls the tool exchanger so as to fit and remove the tool holder with respect to the spindle; and a rotation position storage unit which stores information on a rotation position of the spindle about an axis when the determination of the phase of the tool holder is completed, wherein the numerical controller controls the spindle drive unit such that when the tool holder held by the grip is fitted to the spindle, in a state where at least the key groove of the tool holder is inserted in the spindle key, the spindle is rotated to press the spindle key to the key groove of the tool holder so as to determine a phase of the tool holder with respect to the spindle, and wherein after the determination of the phase of the tool holder is completed, the numerical controller compensates for the rotation position of the spindle based on the information on the rotation position stored in the rotation position storage unit.

* * * * *